United States Patent [19]

Scordato et al.

[11] E Re. 30,453

[45] Reissued Dec. 23, 1980

[54] PIPETTES

[75] Inventors: Emil A. Scordato, Eastchester; William C. Strobel, Bronx, both of N.Y.

[73] Assignee: Medical Laboratory Automation, Inc., Mount Vernon, N.Y.

[21] Appl. No.: 21,965

[22] Filed: Mar. 19, 1979

Related U.S. Patent Documents

Reissue of:

[64] Patent No.: 3,853,012
Issued: Dec. 10, 1974
Appl. No.: 186,023
Filed: Oct. 4, 1971

[51] Int. Cl.[3] ..... B01L 3/02

[52] U.S. Cl. ..... 73/425.6

[58] Field of Search ..... 73/425.4 P, 425.6; 222/215

[56] References Cited

U.S. PATENT DOCUMENTS

| | | | |
|---|---|---|---|
| 2,724,275 | 11/1955 | Persson | 73/425.6 |
| 2,875,760 | 3/1959 | Haber | 128/215 |
| 3,525,264 | 8/1970 | Nieglos | 73/425.6 |
| 3,766,785 | 10/1973 | Smernoff | 73/254.6 |

FOREIGN PATENT DOCUMENTS 883053 7/1953 Fed. Rep. of Germany .

*Primary Examiner*—S. Clement Swisher
*Attorney, Agent, or Firm*—William P. Keegan

[57] ABSTRACT

A manual pipette adapted to use disposable plastic tips into which a liquid is drawn and from which it is dispensed is provided with means for dislodging the tip from the pipette after use. The disposable tip which is normally frictionally held at the distal end of the pipette is pushed off the pipette by a sleeve member that is slideably mounted on the barrel of the pipette.

13 Claims, 2 Drawing Figures

PIPETTES

Matter enclosed in heavy brackets [ ] appears in the original patent but forms no part of this reissue specification; matter printed in italics indicates the additions made by reissue.

This invention relates to manual pipettes that employ disposable tips into which a liquid is drawn, and more particularly to means for automatically removing such tips after use.

Over the past several years, the conventional mouth pipette has been giving way to manual pipettes. While the mouth pipette has been entirely satisfactory in use, and indeed may be preferred by the skilled technician who can manipulate it quite well and can dispense fluids from it with great accuracy, it has several disadvantages when compared to manual pipettes, especially those adapted to use a disposable tip. In the first place, the mouth pipette requires that the technician using it develop a certain facility for drawing a measured quantity of liquid into the pipette, and for dispensing exact amounts of liquid from the pipette. Secondly, when used for pipetting liquids from different samples, e.g., from different blood plasma samples when performing prothrombin time determination tests, a clean pipette must be used for each sample. A third disadvantage of mouth pipettes is that careless use may result in drawing samples of biological fluids, such as plasma or blood cells, into the mouth with consequent risk of infection by pathogenic organisms contained in such samples.

The advantages of manual pipettes with disposable tips are manifest. Relatively unskilled technicians can draw and dispense exact quantities of a liquid, depending only on the accuracy of the pipette mechanism. Disposable tips are cleaned when packaged and are disposed of after each use so that, if their price is comparatively low, as it is, they involve less expense than is incurred in re-cleaning mouth pipettes. Also, since they are disposed of after each use, they eliminate the possibility of cross contamination between different samples being pipetted.

The disposable tips that are used with manual pipettes are generally elongated cone shaped members formed of a suitable plastic material which can be wedge fitted onto the tapered end of the pipette proper. In use, the pipette is pressed into the disposable tip with sufficient force to insure that the tip will be frictionally held in place as a liquid is drawn into and dispensed therefrom. After such use, the tip can be dislodged and discarded by removing it with one hand while the pipette is held with the other. Or de-tipping members can be supplied to wedge the disposable tip off the pipette as the pipette is moved into contact with the de-tipping member. Another de-tipping member permits the disposable tip to fit under a ledge whereupon an upward pull on the pipette dislodges the tip.

It is the object of the present invention to provide a pipette having means to remove the disposable tip from the pipette after use without the need of auxiliary de-tipping members and without the necessity for the technician to touch the disposable tip. It is also an object of the invention to provide means for limiting the force with which a technician can press the pipette into the disposable tip when securing the latter to the pipette.

In carrying out the invention there is provided, essentially, a pipette having a tapered end over which a disposable tip is wedge fitted, and a sleeve member fitted over the pipette body and spring biased away from the tapered end of the pipette. The sleeve member is slideable towards a disposable tip placed on the end of the pipette so that it bears against and pushes the disposable tip off the pipette.

Features and advantages of the invention may be gained from the foregoing and from the description of a preferred embodiment thereof which follows:

Figure 1:
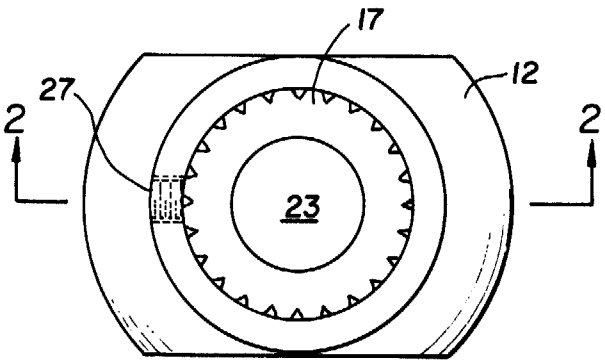
FIG. 1 is a top plan view of the pipette.
Figure 2:
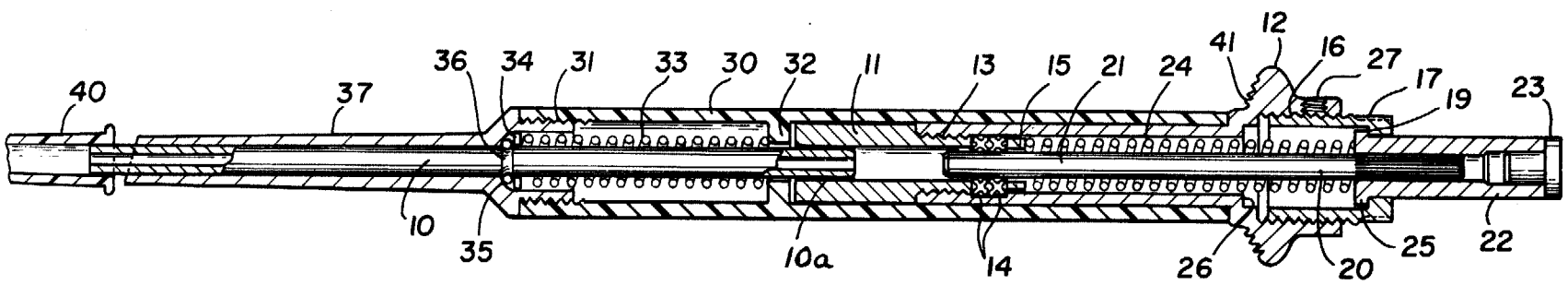
FIG. 2 is a longitudinal cross-sectional view of the pipette taken along line 2—2 of FIG. 1.

In describing the present invention, attention will first be directed to what may be considered the pipette itself. A relatively elongated tube 10, preferably stainless steel, is press fitted or brazed at joint 10a to hollow, cylindrical member 11. The peripheral surface of the distal end of tube 10 may be slightly tapered to facilitate it being wedged into a disposable pipette tip 40. Member 11, at its remote end, is reduced in diameter and the reduced portion is externally threaded.

A hollow finger grip member 12, shaped substantially as shown, is threaded internally at 13 so that grip member 12 can be threaded onto member 11. Before joining the two members, however, a pair of "quad" rings 14 are placed inside the end of grip member 12 and against the annular ring 15. Consequently, when members 11 and 12 are threaded together, quad rings 14 are secured in a groove formed by the end of member 11 and annular ring 15. Annular ring 15, which is a separate member, applies an axial force to the quad rings thereby maintaining an inward radial sealing force upon piston 21. The quad rings will serve as an air tight seal around the pipette piston as will presently be seen. The other end of grip member 12 also is internally threaded at 16. A restraining nut 17 having an inwardly turned rim 19 is externally threaded for engagement with the threaded section 16 of member 12.

The plunger assembly 20 of the pipette comprises a piston 21 which is knurled at one end and press fitted into a finger actuated cap 22. The remote end of piston 21 extends through quad rings 14 at all times during its reciprocation to fill and discharge the pipette. The quad rings snugly surround the piston so as to maintain an air tight seal. A decorative insert 23 may be provided to give an attractive appearance to the pipette, especially if it is a colored plastic insert. A compression spring 24 biases plunger assembly 20 to a position where the flange 25 of cap 22 abuts rim 19 of restraining unit 17. If plunger assembly 20 is moved against the action of spring 24 its movement is ultimately arrested by the engagement of flange 25 with shoulder 26 formed on the inside of grip member 12. It should be clear that the capacity of the present pipette depends upon the distance travelled by the plunger assembly 20 between the positions determined by shoulder 26 and rim 19. It should also be clear that the position of rim 19 can be varied depending upon how far nut 17 is threaded into grip member 12. Consequently, by finely adjusting the position of nut 17 the capacity of the pipette can be set very accurately. A set screw 27 is provided to lock nut 17 in its adjusted position with respect to grip member 12.

The disposable tip removing assembly comprises a sleeve member 30 that is fitted around the outside surface of members 11 and 12. One end of sleeve member 30 is internally threaded at 31 and an annular ring 32 is provided. A compression spring 33, loosely fitted over tubing 10 bears against ring 32 and urges sleeve member 30 into engagement with the underside of the transverse arms of grip member 12. The other end of spring 33 is restrained by a washer 34 and a "C" circlet 35 the latter of which is snapped into a groove 36 formed on the periphery of tube 10. A de-tipping member 37 is threaded into the threaded position of sleeve member 30.

The sequence of steps for assembling the present pipette will be outlined since, at first glance, it may appear difficult to assemble the pipette due to the relatively complicated shapes of the various parts thereof.

Tubing 10 is first press fitted or brazed to member 11 after which quad rings 14 are placed within the elongated portion of finger grip member 12 and the latter screwed on to the reduced threaded portion of member 11. The parts thus assembled are then placed within sleeve member 30 as far as they will go. Next, compression spring 33 is slipped over tubing 10 and compressed by washer 34 as circlet 35 is snapped into groove 36. The de-tipper member 37 is then slipped over tubing 10 and threaded into sleeve member 30. The plunger assembly is next formed by press fitting cap 22 onto piston 21. Compression spring 24 is slipped over piston 21, and the latter is inserted through quad rings 14. Now nut 17 is fitted over cap 22 and threaded into grip member 12. The distance nut 17 is threaded into member 12 depends on the desired capacity of the pipette which in turn depends on the stroke of piston 21. This, of course, is determined by the distance flange 25 moves between the variably position rim 19 of nut 17 and shoulder 26. Once rim 19 is at the desired location, set screw 27 is tightened to lock nut 17 in place.

A filling piece could be provided to fit over piston 21 adjacent to flange 25 to shorten the distance travelled by the piston when cap 22 is depressed. Such a piece would enable the volume capacity of the pipette to be readily varied. Either the filling piece could be positioned along piston 21 and locked in a desired position, as by a set screw, or pieces of various lengths could be used to give different piston strokes. In the event a filling piece is used to control the capacity of the pipette, nut 17 would be used to provide a fine adjustment to the volume capacity.

In use, the pipette can be grasped in the way most comfortable to the technician. Either, the pipette can be grasped by the technician making a fist around sleeve member 30 with either the thumb or the index finger placed on insert 23 of cap 22, or by holding the sleeve member between the index and middle fingers with the thumb convenient to cap 22. Of course, the technician may adapt any grip which is found to be comfortable or convenient. To apply a tip, the pipette is then pressed into the open end of a disposable tip 40 which is thus wedged and sealed to the end of the pipette. It will be noted that the maximum engagement force that can be exerted is that exerted by spring 33. Once spring 33 has been compressed to the point where the end of sleeve 37 meets the flange of tip 40, no further tip application force can be applied. If the application force is increased, all that will happen is that sleeve 37 will bear harder directly on tip 40, but the application force will be constant, dictated by the amount of compression of spring 33. If this pressure is made slightly higher than is necessary to insure a good seal, then the amount of force required to effect a proper seal has been optimized while at the same time being reduced to the minimum necessary to perform its function. This removes any uncertainty on the part of the technician about the proper pressure to apply to obtain a good seal between the pipette and its disposable tip. The plunger assembly is then depressed until flange 25 strikes shoulder 26, this action expelling a volume of air from tube 10 equal to the cross sectional area of piston 21 multiplied by the distance travelled by the piston, i.e., the distance between shoulder 26 and rim 19 less the thickness of flange 25. The quad rings 14 insure that all of the air is expelled from tube 10 and that none of it escapes along piston 21. The disposable tip 40 is then inserted into the liquid being pipetted and plunger assembly 20 is released prior to removing the pipette from the liquid. Compression spring 24 moves assembly 20 to the position shown in the drawing, thus drawing a volume of liquid, essentially equal to the volume of air previously expelled, into disposable tip 40. The pipette is then removed from the liquid and the liquid drawn into tip 40 is then discharged into a suitable receptacle by depressing plunger assembly 20 until its travel is arrested by the engagement of flange 25 (or a filling piece if one is incorporated in the pipette) and shoulder 26. To remove disposable tip 40, it is necessary only to hold sleeve member 30, and exert a force against the knurled underside 41 of the transverse arms of grip member 12. This will compress spring 33 and retract tube 10 within member 37 until the end of disposable tip 40 strikes member 37 and is pushed off tube 10. Releasing the force on grip member 12 permits compression spring 33 to restore sleeve 30 and detipping member 37 to the relative positions shown in the drawing.

Having thus described the invention it is clear that what may appear to be different embodiments could be provided without departing from the spirit and scope of the invention. Hence it is intended that the foregoing specification and the drawing be interpreted as illustrative rather than in a limiting sense.

What is claimed is:

1. A manual pipette adapted to have a disposable tip wedge fitted at one end thereof and in co-axial relationship thereto, the arrangement being such that a disposable tip is secured to the pipette only by the frictional force of the wedge fit, said pipette comprising *a piston operating member that is actuated to draw a liquid into and discharge it from a disposable tip,* a detipping member for removing a disposable tip that is wedge fitted to the pipette, said member being slideably mounted on said pipette in a direction parallel to the axis of the pipette and movable between a normal position away from a disposable tip and a position where it engages the end of a disposable tip and thereafter pushes the tip in an axial direction to free it from frictional engagement with the pipette, *resilient means for biasing said detipping member to its normal position, and means adjacent the end of the pipette remote from the end to which a disposable tip is fitted and proximate to said piston operating member for effecting a relative movement between said detipping member and a disposable tip fitted to the pipette whereby one handed operation of the pipette is facilitated when going from a pipetting to a detipping operation.*

[2. A manual pipette according to claim 1 including resilient means for biasing said de-tipping member to its normal position.]

3. A manual pipette according to claim 1 wherein said [de-tipping] *detipping* member is a sleeve member concentric with the pipette.

[4. A manual pipette according to claim 3 including spring means for biasing said sleeve member to its normal position.]

5. A manual pipette according to claim [4] *3* wherein said pipette comprises an elongated tubular member on which a disposable tip is wedge fitted, a finger grip member connected to said elongated tubular member, a plunger assembly mounted within said finger grip member for sliding movement between two stop positions, [an adjustment means for determining use of said positions,] means for biasing said plunger assembly to [the position determined by said adjustment means] *one of said stop positions*, and wherein said sleeve member biasing spring means is a compression spring fitted over said tubular member, and including means secured to said tubular member for restraining one end of said compression spring while its remote end bears against said sleeve member and urges said sleeve member to its normal position.

6. A manual pipette according to claim 5 *including adjustment means for determining one of said stop positions*, wherein said adjustment means is adjustable connected to said finger grip member *and said biasing means biases said plunger assembly to the stop position determined by said adjustment means*, and including locking means for securing said adjustment means in its adjusted position.

7. A manual pipette adapted to have a disposable tip wedge fitted at the end thereof, said pipette comprising a permanent tip member, a sleeve member within which said permanent tip member slides and from which said permanent tip member projects, and spring means for biasing said permanent tip member to its projected position whereby when a disposable tip is being wedge fitted to said permanent tip member as by the pipette being held by said sleeve member and said permanent tip member pressed into engagement with a disposable tip, the force urging said permanent tip member into engagement with the disposable tip is determined by said spring means.

8. A manual pipette according to claim 7 wherein said permanent tip member projects from said sleeve member by a predetermined distance so that when a disposable tip is being wedge fitted to said permanent tip member the end of said sleeve member will engage the end of the disposable tip and the force urging said permanent tip member into engagement with the disposable tip will be determined and limited by said spring means and its amount of compression.

9. A pipette adapted to have a disposable tip mounted at one end thereof, said pipette comprising, a permanent tip member to which a disposable tip is frictionally joined so as to form an air-tight connection, [and] disposable tip removing means for removing a disposable tip from said permanent tip member, said permanent tip member and said disposable tip removing means being supported so as to enable relative movement therebetween as a result of which a disposable tip is disconnected from said permanent tip member, *resilient means for biasing said permanent tip member and said disposable tip removing means away from each other, and actuating means integrally connected with but spaced from said permanent tip member, and wherein said disposable tip removing means is a sleeve-like unit that encloses said permanent tip member but leaves the end thereof projecting from the sleeve-like unit, and wherein said disposable tip removing means is biased into abutting relationship with said actuating means by said resilient means.*

[10. A pipette according to claim 9 wherein the disposable tip is a hollow conical element and said permanent tip member is adapted to fit within the disposable tip which is frictionally held thereon, and wherein the relative movement between said permanent tip member and said disposable tip removing means causes the latter to bear against the end of the disposable tip and thereby to push it off said permanent tip member.]

[11. A pipette according to claim 10 including resilient means for biasing the end of said permanent tip member on which a disposable tip is held and the bearing end of said disposable tip removing means away from each other.]

[12. A pipette according to claim 11 including a grip member means integrally connected with but spaced from said permanent tip member, and wherein said disposable tip removing means is a sleeve-like unit that encloses said permanent tip member but leaves the end thereof projecting from the sleeve-like unit, and wherein said disposable tip removing member is biased into abutting relationship with said grip member means by said resilient means.]

[13. A pipette according to claim 10 including means to effect relative movement between said permanent tip member and said disposable tip removing means whereby a disposable tip is removed from said permanent tip member.]

14. A manual pipette comprising, a permanent tip member adapted to have a disposable tip coupled thereto in an air-tight relationship, means for drawing a liquid into and for expelling it from a disposable tip coupled to said permanent tip member, means independent of said last named means disposed adjacent said permanent tip member and in spaced relationship from the end thereof to which a disposable tip is coupled for dislodging a disposable tip from said permanent tip member when a relative movement between said permanent tip member and said dislodging means is effected, *spring means for biasing said permanent tip member and said disposable tip dislodging means to said spaced relationship, and means adjacent the end of said pipette remote from said permanent tip member for applying a force to overcome the force exerted by said spring means and thereby effect a relative movement between said permanent tip member and said disposable tip dislodging means.*

[15. A manual pipette according to claim 14 including spring means for biasing said permanent tip member and said disposable tip dislodging means to said spaced relationship.]

[16. A manual pipette according to claim 15 including means for applying a force to overcome the force exerted by said spring means and thereby effect a relative movement between said permanent tip member and said disposable tip dislodging means.]

[17. A manual pipette comprising a permanent tip member adapted to have a disposable tip frictionally connected to the outside surface of said member, a tip removing member adjacent the outside surface of said permanent tip member, and means supporting said members for relative movement therebetween whereby as a result of such movement a disposable tip is engaged by said tip removing member and freed from its frictional connection with said permanent tip member.]

*18. A pipette adapted to have a disposable tip mounted at one end thereof, said pipette comprising a permanent tip member to which a disposable tip is frictionally joined so as to form an air-tight connection, and disposable tip remov-*

*ing means for removing a disposable tip from said permanent tip member, said permanent tip member and said disposable tip removing means being supported so as to enable relative movement therebetween as a result of which a disposable tip is disconnected from said said permanent tip member, resilient means for biasing said permanent tip member and said disposable tip removing means away from each other, and means adjacent the end of said pipette remote from said permanent tip member to effect relative movement between said permanent tip member and said disposable tip removing means whereby a disposable tip is removed from said permanent tip member without the need for a pipette operator to change his grip on the pipette when going from a pipetting to a detipping operation.*

*19. A manual pipette according to claim 5 wherein said sleeve member encompasses said elongated tubular member and is the member by which the pipette is gripped during pipetting and detipping operations whereby the plunger assembly is urged by its biasing means in one direction relative to said sleeve member and said finger grip member is urged by said biasing spring means in the opposite direction relative to said sleeve member so that said plunger assembly is manually actuated in one direction during a pipetting operation and the finger grip member is manually actuated in the opposite direction during a detipping operation.*

*20. A pipette comprising, pipette means having a distal end and a proximate end with a central bore extending longitudinally through said means and adapted to have a disposable pipette tip wedge fitted on the outside surface at the distal end of said means, piston means connected to said. pipette means including a piston actuating member extending axially from the proximate end of said pipette means, spring means biasing said piston means to its most remote position from the distal end of said pipette means, a disposable tip removing member slideably positioned at the distal end of said pipette means, additional spring means for biasing said tip removing member away from the end of said pipette means so that a disposable tip may be fitted on the distal end of said pipette means, and means located at the proximate end of said pipette means to enable the application of a manual force to overcome the force exerted by said additional spring means and cause a relative movement between said pipette means and said tip removing member, whereby said tip removing member engages a disposable tip fitted on said pipette means and pushes the disposable tip off said pipette means.*

*21. A pipette according to claim 20 wherein said tip removing member is a sleeve means that substantially encloses said pipette means and is the principal means by which the pipette is grasped, said force applying means is connected to said pipette means, and said additional spring means biases said sleeve member into engagement with said force applying means.*

*22. A pipette according to claim 21 wherein said sleeve means is provided with an internal abutment means, said pipette means is provided with a spring retaining means, and said additional spring means is a compression spring acting between said abutment means and said spring retaining means.*

* * * * *